(12) United States Patent
Kitahara et al.

(10) Patent No.: US 7,166,830 B2
(45) Date of Patent: Jan. 23, 2007

(54) LIGHT DETECTING SENSOR

(75) Inventors: Tadashi Kitahara, Hamamatsu (JP);
Yoshiro Nomoto, Hamamatsu (JP);
Norio Ichikawa, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 53 days.

(21) Appl. No.: 10/511,086

(22) PCT Filed: Apr. 11, 2003

(86) PCT No.: PCT/JP03/04638

§ 371 (c)(1),
(2), (4) Date: Oct. 14, 2004

(87) PCT Pub. No.: WO03/087739

PCT Pub. Date: Oct. 23, 2003

(65) Prior Publication Data

US 2005/0140293 A1 Jun. 30, 2005

(30) Foreign Application Priority Data

Apr. 17, 2002 (JP) ............................. 2002-115040

(51) Int. Cl.
*G01J 1/44* (2006.01)
*H01L 29/06* (2006.01)
(52) U.S. Cl. .................... 250/214 R; 257/10
(58) Field of Classification Search ............ 250/214 R, 250/214, 214 VT, 214.1, 227, 372, 505.1; 257/10, 11, 433, 434, 431
See application file for complete search history.

(56) References Cited

U.S. PATENT DOCUMENTS

| | | | | |
|---|---|---|---|---|
| 3,394,280 A | * | 7/1968 | Trumble | 250/385.1 |
| 3,732,452 A | * | 5/1973 | Axmark et al. | 313/538 |
| 3,983,437 A | * | 9/1976 | Benson et al. | 313/537 |
| 4,077,017 A | * | 2/1978 | Gilson et al. | 372/86 |
| 4,094,703 A | * | 6/1978 | Williams | 136/254 |
| 5,349,194 A | * | 9/1994 | Wuest et al. | 250/372 |
| 6,043,508 A | * | 3/2000 | Oikari et al. | 257/10 |
| 6,121,621 A | * | 9/2000 | Warashina et al. | 250/372 |

FOREIGN PATENT DOCUMENTS

| | | |
|---|---|---|
| JP | 63-190935 | 12/1988 |
| JP | 4-61852 | 5/1992 |
| JP | 7-050149 | 2/1995 |
| JP | 11-045680 | 2/1999 |
| JP | 2000-75037 | 3/2000 |

OTHER PUBLICATIONS

T. Kitahara et al., "Robust Photodetector for Vacuum Ultraviolet Laser Light", *Review of Scientific Instruments*, vol. 75, No. 4, Apr. 2004, pp. 1149-1154.

* cited by examiner

*Primary Examiner*—Georgia Epps
*Assistant Examiner*—Don Williams
(74) *Attorney, Agent, or Firm*—Drinker Biddle & Reath LLP (57) ABSTRACT

A substrate 18, a cathode 20 and an anode 22 are stored in a space demarcated by a casing 10, and the space is evacuated. The cathode 20 and the anode 22 are provided on the same surface of a substrate 18 having electric insulation, and have a comb-tooth shape so as to be mutually engaged. Therefore, the area of the part in which the cathode 20 and the anode 22 approach each other becomes larger, and thereby photoelectrons discharged from the cathode 20 through the incidence of ultraviolet rays are transmitted in the vacuum, and are favorably collected in the anode 22.

5 Claims, 9 Drawing Sheets

LIGHT DETECTING SENSOR

FIELD OF THE ART

The present invention relates to a light detecting sensor.

BACKGROUND ART

A light detecting sensor has a cathode discharging photoelectrons by the incidence of light, and an anode collecting the photoelectrons, and in general, a transmissive light detecting sensor and a reflective light detecting sensor exist. In the transmissive light detecting sensor, the cathode is provided on a light incident side to the anode, and in the reflective light detecting sensor, the anode is provided on a light incident side to the cathode.

DISCLOSURE OF THE INVENTION

However, since one electrode is provided on the light incident side for the other electrode in the light detecting sensor having the above configuration, the structure of the light detecting sensor is complex.

The present invention is accomplished in light of the foregoing circumstances; an object of the invention is to provide a structurally simple light detecting sensor.

The light detecting sensor according to the present invention is provided with, to accomplish the above-described object, a substrate having electric insulation, a cathode discharging photoelectrons through the incidence of light, an anode collecting the photoelectrons discharged from the cathode and a casing having a space storing the substrate, the cathode and the anode, the space being evacuated, wherein the cathode and the anode are provided on the same surface of the substrate.

In accordance with the present invention, the photoelectrons discharged from the cathode through the incidence of light are transmitted in the vacuum, and are collected in the anode. Since the cathode and the anode are provided on the same surface of the substrate having electric insulation, the structure of the sensor can be simplified.

In the present invention, it is preferable that the cathode and the anode have a comb-tooth shape so as to be mutually engaged. Since the cathode and the anode have a comb-tooth shape so as to be mutually engaged in the above configuration, the area of the part in which the cathode and the anode approach each other becomes larger, and thereby the sensitivity of the sensor can be improved.

In the present invention, it is preferable that a plurality of anodes are provided. In the above configuration, the photoelectrons discharged from the cathode are collected in the anode which is adjacent to the cathode among a plurality of anodes. Therefore, the number of photoelectrons which are respectively collected in a plurality of anodes is different in the incident parts of light. Accordingly, an one-dimensional sensor or a two-dimensional sensor can be achieved.

In the present invention, it is preferable that the cathode discharges the photoelectrons through incidence of ultraviolet rays. Since the photoelectrons are discharged by the incidence of ultraviolet rays in the above configuration, an ultraviolet sensor can be achieved.

In the present invention, it is preferable that the width of the cathode is set to be larger than that of the anode. The area of the cathode is relatively larger in the above configuration. Thereby, the discharged amount of the photoelectrons can be increased, and the sensitivity of the sensor can be improved.

In the present invention, it is preferable that the cathode contains a plurality of principal, cathode parts radially extended, and a diverging cathode part provided for every principal cathode part so as to intersect the principal cathode part. Also, it is preferable that the anode contains a plurality of principal anode parts provided so as to radially extend between the principal cathode parts being adjacent, and a diverging anode part provided for every principal anode part so as to intersect the principal anode part. In addition, it is preferable that the diverging cathode part and the diverging anode part are provided so as to overlap mutually when viewed in the radial direction. In the above configuration, the photoelectrons discharged from the cathode (principal cathode parts and diverging cathode part) are collected in the principal anode part and a diverging anode part which are adjacent to the cathode among a plurality of principal anode parts and a diverging anode part. Therefore, the number of photoelectrons which are respectively collected in a plurality of anodes is different in the incident parts of light. Accordingly, the light incident position can be generally known, and a two-dimensional sensor can be achieved.

BEST MODE FOR CARRYING OUT THE INVENTION

Hereinafter, the preferred embodiment of the light detecting sensor according to the present invention will be described in detail with reference to the accompanying drawings. In the description of the drawings, identical components or components having identical functions are designated by the same reference numerals, and overlapping description is omitted. The present invention is adopted in an ultraviolet sensor for detecting ultraviolet rays in the present embodiment.

Figure 1:
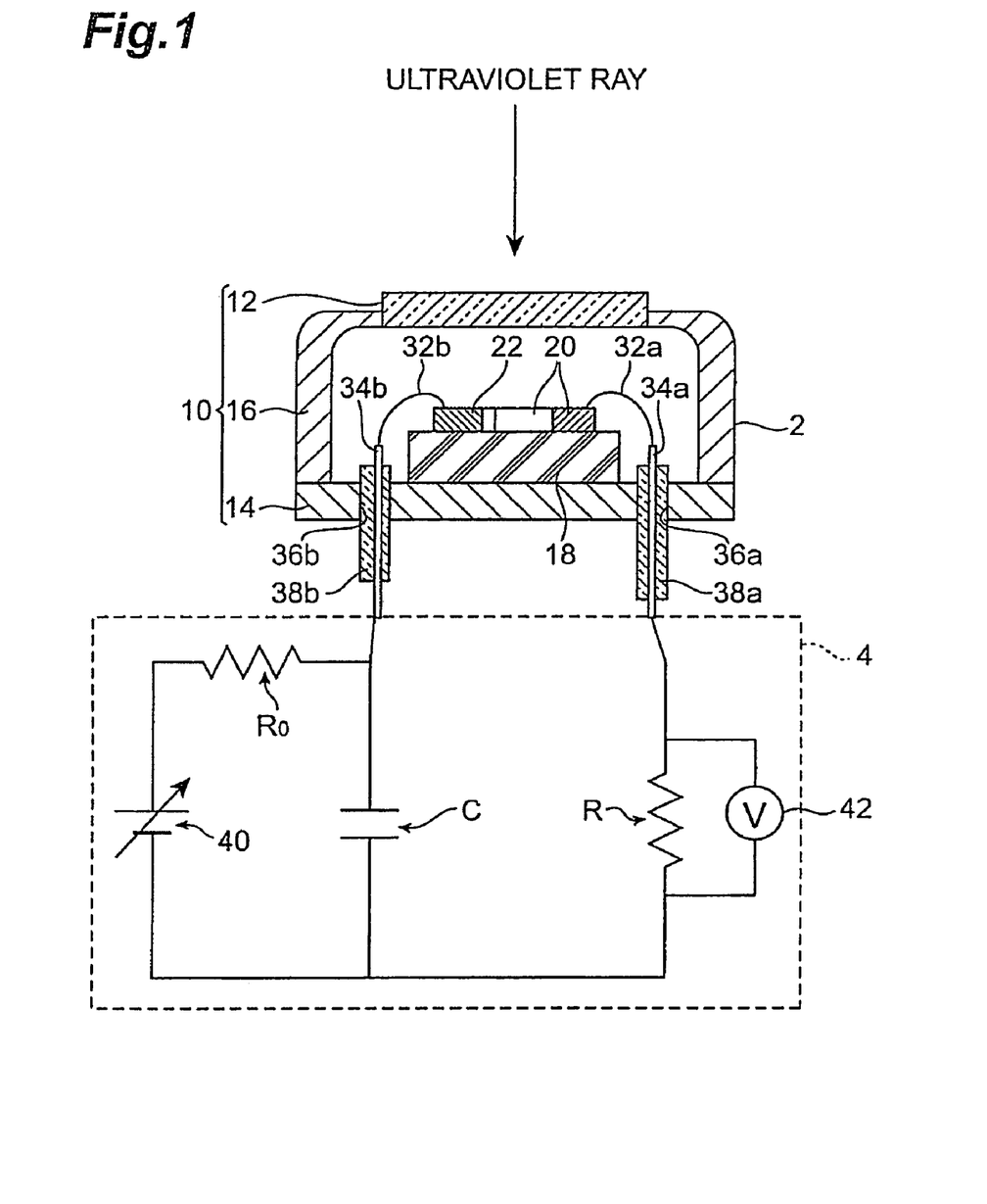
FIG. 1 is a block diagram of an ultraviolet sensor and a measuring circuit according to the present embodiment.

First, an ultraviolet sensor according to the present embodiment will be described based on FIG. 1 to FIG. 3. FIG. 1 is a block diagram of an ultraviolet sensor and a measuring circuit according to the present embodiment.

Figure 2:
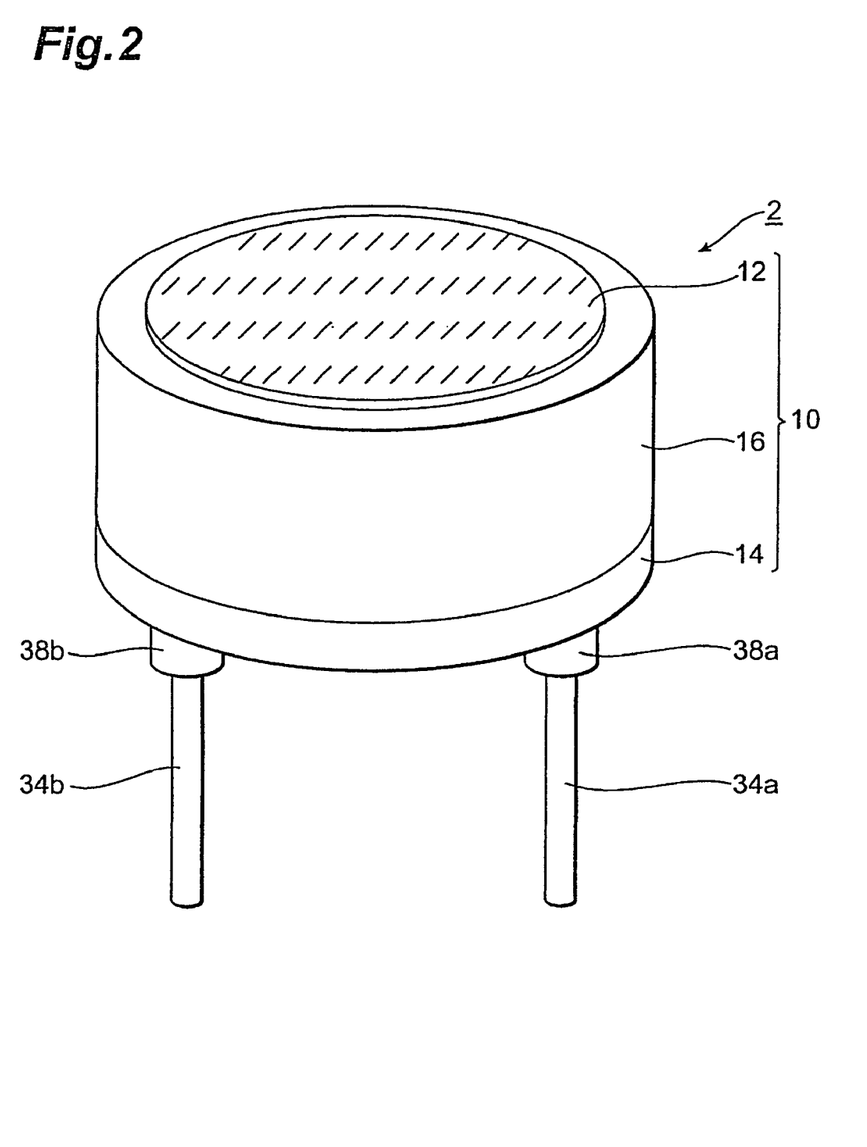
FIG. 2 is a perspective view showing an ultraviolet sensor according to the present embodiment.

FIG. 2 is a perspective view showing an ultraviolet sensor according to the present embodiment. FIG. 3 is a perspective view showing the inside of an ultraviolet sensor according to the present embodiment. In FIG. 1, to clarify the inside configuration of the ultraviolet sensor, the sectional view of only the ultraviolet sensor is shown.

The ultraviolet sensor 2 has a casing 10 and a substrate 18. The casing 10 has an incident window 12 which is made of magnesium fluoride and penetrates ultraviolet rays, a circular base part 14, and a cylindrical wall part 16 of which the both ends are closed by the incident window 12 and the base part 14. A space demarcated by the incident window 12, the base part 14 and the wall part 16 is internally evacuated to a vacuum. Herein, the term "vacuum" means a state where a gas included in the casing 10 is not ionized by the photoelectrons discharged, and the degree of vacuum is 10 Pa or less. For instance, the degree of vacuum is approximately $10^{-2}$ Pa, or the degree of vacuum is further improved by evacuating. When inert gases such as nitrogen, helium, neon and argon are included, the degree of vacuum may be approximately 1 Pa.

The substrate 18 has electric insulation. The substrate 18 may be a single crystal, a polycrystal or an amorphous ionic binding solid, or a sintered body of a powder thereof selected from the group consisting of sapphire, aluminum nitride, gallium nitride, calcium fluoride, magnesium fluoride, aluminum fluoride, a quartz crystal, lithium niobate and niobate tantalum. Also, the substrate 18 may be a semiconductor such as silicon, or be obtained by executing electric insulation treatment to the surface of a metal such as aluminum.

For instance, the shape of the substrate 18 when viewed from the incident side of ultraviolet rays is a square shape. When the substrate 18 has a square shape, the substrate 18 has the area of 100 mm$^2$ (=10 mm×10 mm), and the thickness of approximately 0.5 mm. The substrate 18 of this type is welded and secured in the center of the circular base part 14, and stored in the space of the casing 10.

A cathode 20 and an anode 22 are provided on the surface of the ultraviolet rays incident side of the substrate 18. The cathode 20 discharges photoelectrons by the incidence of ultraviolet rays, and the anode 22 collects the photoelectrons discharged from the cathode 20. The cathode 20 and the anode 22 have a comb-tooth shape. That is, the cathode 20 has a first part 24 and a plurality of second parts 26 extending in the same direction from the first part 24, and the anode 22 has a first part 28 and a plurality of second parts 30 extending in the same direction from the first part 28. The shapes of the first parts 24 and 28 and the second parts 26 and 30 are a rectangle when viewed from the incident side of ultraviolet rays. As shown in FIG. 3, the number of the second parts 26 and 30 of the cathode 20 and the anode 22 is "3."

The cathode 20 and the anode 22 having the comb-tooth shape are provided such that the second parts 26 of the cathode 20 enter between the second parts 30 of the anode 22, and are provided so as to be mutually engaged. That is, the cathode 20 and the anode 22 are provided so as to overlap the second parts 26 and 30 viewed from a direction in which the first parts 24 and 28 of the cathode 20 and the anode 22 extend (in which a long side of the rectangle extends). Therefore, the second part 26 of the cathode 20 is adjacent to the second part 30 of the anode 22. For instance, the area of the adjacent part (overlapping part) is 49 mm$^2$ (=7 mm×7 mm).

The second parts 26 and 30 of the cathode 20 and the anode 22 have a width (length in a direction in which the first parts 24 and 28 extend) of 20 μm, and the distance (distance in a direction in which the first parts 24 and 28 extend) between the second part 26 of the cathode 20 and the second part 30 of the anode 22 is set to 40 μm.

The cathode 20 is connected to one end of a lead pin 34a through a bonding wire 32a, and the anode 22 is connected to one end of the other lead pin 34b through a bonding wire 32b. The lead pins 34a and 34b penetrate through glass fused parts 38a and 38b. The glass fused parts 38a and 38b are inserted in pin holes 36a and 36b which penetrate through the base part 14. Therefore, the lead pins 34a and 34b are fixed to the base 14 through the glass fused parts 38a and 38b.

The cathode 20 has a single-layer structure or a double-layer structure. When the cathode 20 is made of a material having excellent adhesion to a substrate such as a semiconductor containing diamond and gallium nitride which are made into a semiconductor by doping impurity, the cathode 20 may have the single-layer structure. When the cathode 20 is made of a material having comparatively inferior adhesion to a substrate such as gold, the cathode 20 is obtained by forming a second layer on the first layer after forming a high-melting material as the first layer.

When the cathode has a double-layer structure, a first layer of the side of the substrate 18 is a high-melting material such as titanium, chrome or nickel, and is formed by a laser abrasion method, a sputtering method or an evaporation method. As a result, the cathode 20 is firmly fixed to the substrate 18. A second layer of the side of the incident window 12 is made of metals such as gold, silver, copper or aluminum, or semiconductors such as diamond or aluminum nitride which are made into a semiconductor. The metals are a material discharging the photoelectrons by the incidence of ultraviolet rays. For instance, in the cathode 20 of this type, the first layer has a thickness of 20 nm, and the second layer has a thickness of 150 nm. The anode 22 may be made of the same material as that of the cathode 20, and may be made of a different material. The cathode 20 and the anode 22 may be formed by a photolithographic method and a method for removing a metal or a semiconductor thin film by using a laser processing or the like after forming the thin film on a substrate.

The other ends of the lead pins 34a and 34b are connected to a measuring circuit 4 for measuring the photocurrent from the ultraviolet sensor 2. The measuring circuit 4 has a load resistor R, a power supply 40, a current limiting resistance $R_0$, a capacitor C and a voltmeter 42.

The other end of the lead pin 34a is connected to one end of the load resistor R, and the other end of the load resistor R is connected to a negative electrode of the power supply 40. A positive electrode of the power supply 40 is connected to one end of the current limiting resistance $R_0$, and the other end of the current limiting resistance $R_0$ is connected to the other end of the lead pin 34b. The capacitor C is provided in parallel to the power supply 40 and the current limiting resistance $R_0$ in the measuring circuit 4, and the voltmeter 42 is provided in parallel to the load resistor R. For instance, the current limiting resistance $R_0$ is 1MΩ, and the capacitor C is 0.1 μF. The power supply 40 can be adjusted within the range of the voltage value of +5 to 100V.

In the measuring circuit 4 of this type, the ultraviolet rays can be detected by setting the voltage value from the power supply 40 to a prescribed value. The measurement of the incident amount of ultraviolet rays is performed by measuring the voltage change in the both ends of the load resistor R using the voltmeter 42.

Figure 4:
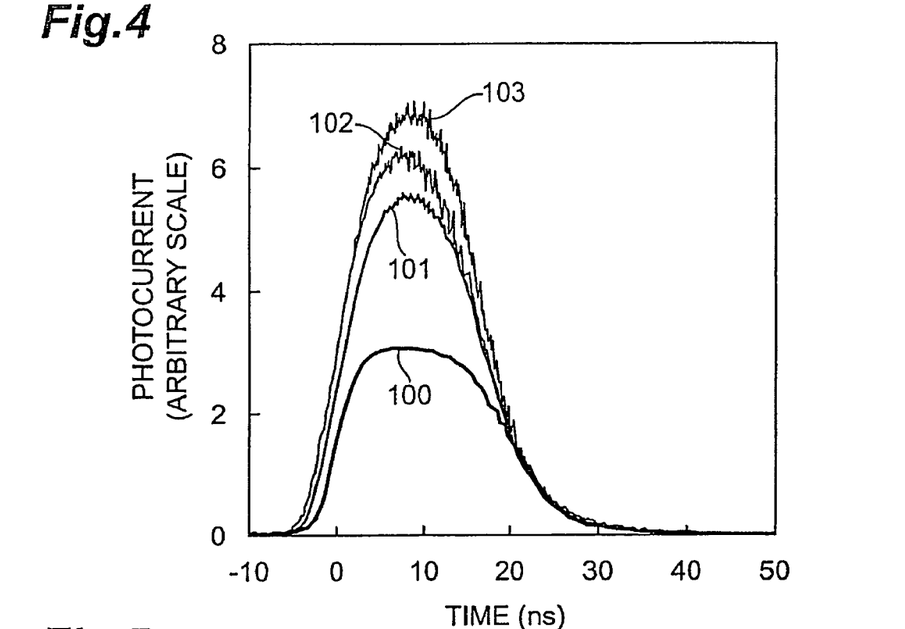
FIG. 4 is a graph showing the value of a photocurrent flowing through a load resistor when an ultraviolet sensor of the present embodiment is irradiated with ultraviolet rays.
Figure 5:
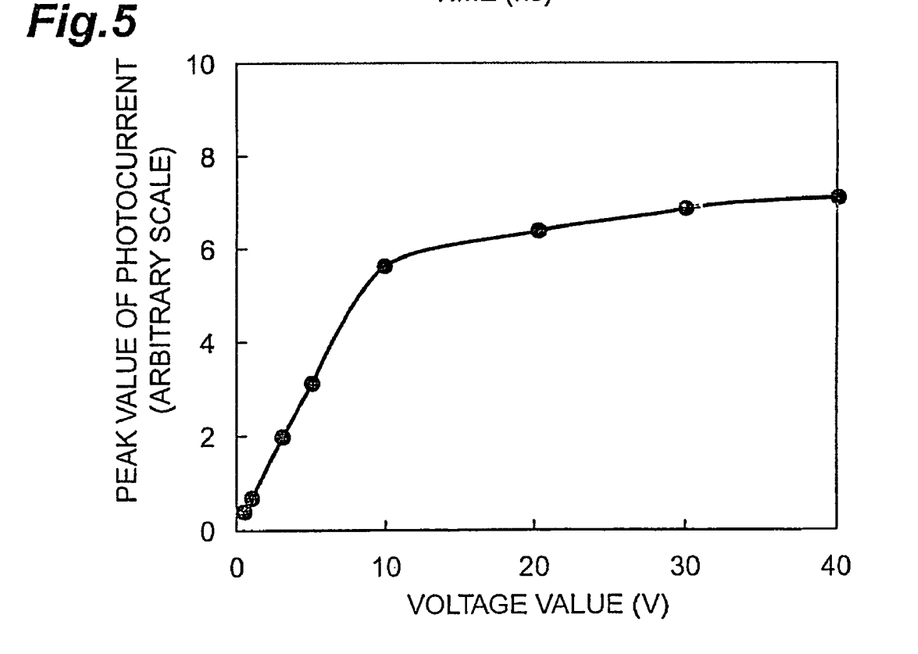
FIG. 5 is a graph showing the peak value of the photocurrent shown in FIG. 4.

Herein, it is preferable that the voltage value of the power supply is set to 10V or more. Hereinafter, the dependence of the photocurrent due to the voltage value of the power supply will be described by referring to FIG. 4 and FIG. 5. FIG. 4 is a graph showing the value of a photocurrent flowing through a load resistor R when an ultraviolet sensor 2 is irradiated with ultraviolet rays. FIG. 5 is a graph showing the peak value of the photocurrent shown in FIG. 4.

FIG. 4 shows the change with time in the value of the photocurrent based on the voltage values (5V, 10V, 20V, 40V) of the power supply. In FIG. 4, a horizontal axis shows time (ns), and a vertical axis shows the value of the photocurrent (arbitrary unit). As shown in FIG. 4, in the voltage value of the power supply of 10V (curve 101), 20V (curve 102) and 40V (curve 103), when the time is 10 ns, the value of the photocurrent is the maximum value. In contrast, in the power supply of the voltage value of 5V (curve 100), when the time is 5 ns, the value of the photocurrent is the maximum value. Thus, when the power supply of the voltage value is 5V, the photoelectrons are not well collected between the time of 5 ns and the time of 15 ns.

FIG. 5 shows the peak value of the photocurrent to the voltage value of the power supply. In FIG. 5, a horizontal axis shows a voltage value (V), and a vertical axis shows the peak value of the photocurrent (arbitrary unit). As shown in FIG. 5, a rise in the voltage value causes a comparatively gentle rise in the peak value in the section of the voltage value of 10V to 40V. In contrast, in the section of a voltage value of 0V to 10V, when the voltage value is raised, the peak value rises more rapidly than that of the section of the voltage value of 10V to 40V. Thus, FIG. 5 shows that when the voltage value of the power supply is 10V or more, the incident amount of ultraviolet rays can be stably measured regardless of the voltage value of the power supply 40.

When the ultraviolet rays are made incident through the incident window 12, and reach the cathode 20 having the comb-tooth shape in the ultraviolet sensor 2 having the above configuration, the photoelectrons are discharged into the vacuum from the cathode 20. The photoelectrons discharged into the vacuum are collected in the anode 22 having a comb-tooth shape so as to be engaged with the cathode 20 on the same surface of the substrate 18.

Thus, since the cathode 20 and the anode 22 are provided on the same surface of the substrate 18 having insulation in the ultraviolet sensor 2 according to the present embodiment, the structure of the sensor 2 can be simplified.

The photoelectrons discharged from the cathode 20 by the incidence of ultraviolet rays are transmitted in the vacuum, and are collected in the anode 22. At this time, since the cathode 20 and the anode 22 have a comb-tooth shape so as to be mutually engaged, the area of the part in which the cathode 20 and the anode 22 approach each other becomes larger, and thereby the sensitivity of the sensor can be improved.

Since the photoelectrons are discharged through the incidence of ultraviolet rays in the ultraviolet sensor 2 according to the present embodiment, the ultraviolet sensor can be achieved.

Since the photoelectrons discharged from the cathode 20 are immediately collected in the anode 22 being adjacent to the cathode 20 in the ultraviolet sensor 2 according to the present embodiment, it is difficult to produce a situation where the adhesion of the photoelectrons to the incident window 12 influences an impressed electric field. Therefore, the substrate 18 can be provided adjacent to the incident window 12, and the position of an acceptance surface can be made comprehensible and a transmissive photoelectric tube, thereby improving convenience.

The surface oxidation and degeneration can be prevented in an electrode formation process of photolithography or the like by using a metal electrode for the cathode 20 and the anode 22, and by using a material which is chemically safe such as gold, silver, platinum, tantalum, molybdenum, tungsten, nichrome and nickel or the like for a material of the metal electrode. The degeneration due to residual oxygen or residual chemical material in the casing 10 when strong light having a short wavelength is irradiated can be also prevented. As a result, the photoelectric detection of strong ultraviolet light and vacuum ultraviolet light can be performed with high reliability.

Various modifications can be made in the cathode 20 and the anode 22 used for the ultraviolet sensor 2 according to the above embodiment. Hereinafter, modifications will be described.

Figure 6:
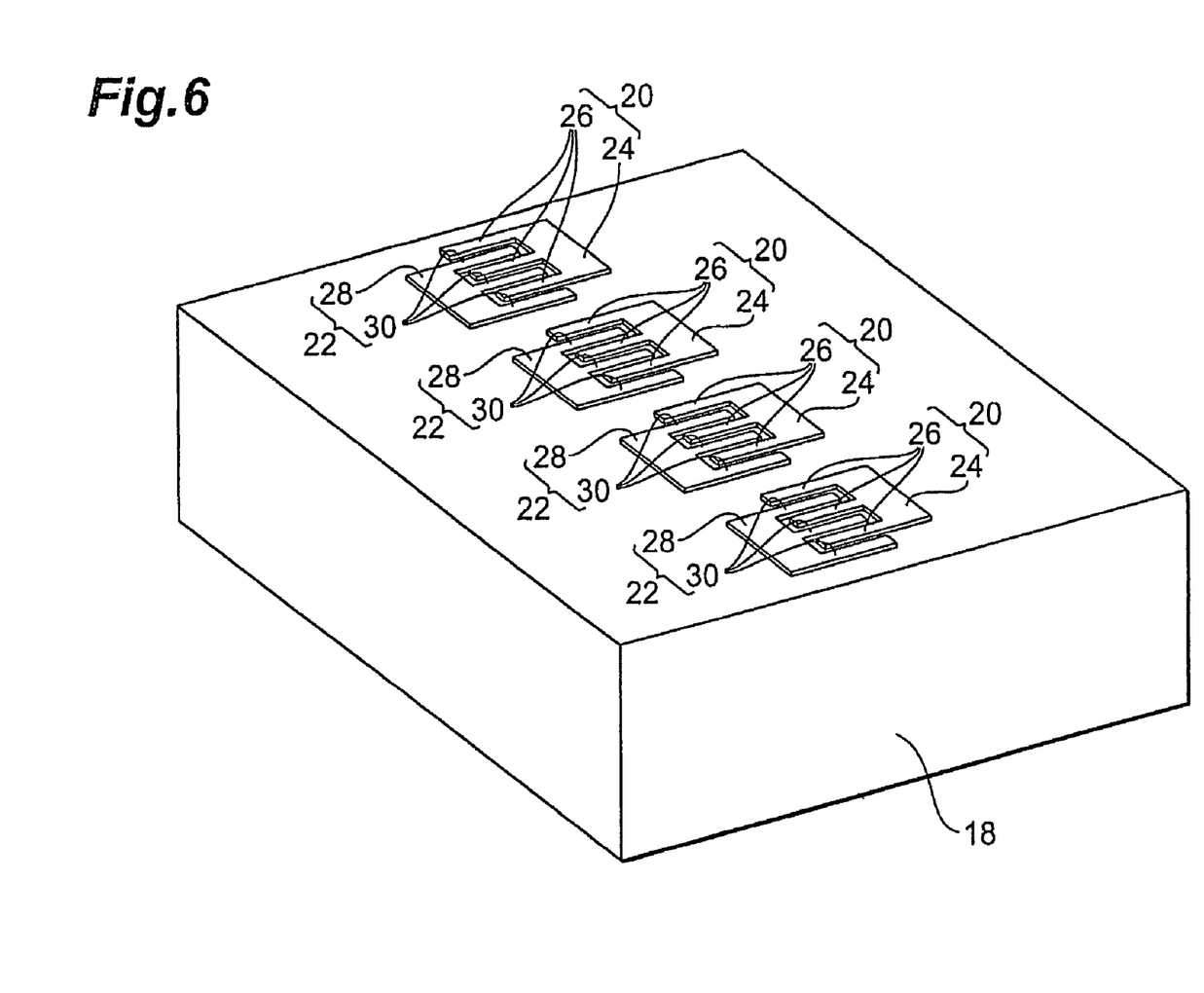
FIG. 6 is a block diagram of a first modification of a cathode and an anode of an ultraviolet sensor according to the present embodiment.

FIG. 6 is a block diagram of a first modification of the cathode 20 and the anode 22 used for the ultraviolet sensor 2. Though only a pair of the cathode 20 and the anode 22 shown in FIG. 3 is provided on the substrate 18, a plurality of pairs (four pairs) of the, cathode 20 and the anode 22 are provided in the first modification, as shown in FIG. 6.

The shapes of the cathode 20 and the anode 22 are the same as that of the one shown in FIG. 6. Each pair of the cathode 20 and the anode 22 is provided so as to be mutually engaged similar to the one shown in FIG. 6. A plurality of cathodes 20 are provided along a direction in which the first part 28 of the rectangle extends (in which a long side of the rectangle extends). A plurality of anodes 22 are also provided similar to a plurality of cathodes 20. That is, a plurality of pairs of the cathode 20 and the anode 22 which are mutually engaged are provided in one direction.

When ultraviolet rays are made incident through the incident window 12 and reach the cathode 20 having a comb-tooth shape in the ultraviolet sensor 2 having the cathode 20 and the anode 22 described above, the photoelectrons are discharged from the cathode 20 into the vacuum. The photoelectrons discharged in the vacuum are collected in the anode 22 which is nearest to the cathode 20.

Thus, since a plurality of anodes 22 are provided in the ultraviolet sensor 2 according to the present modification, the photoelectrons discharged are collected in the anode which are adjacent to the cathode 20 the among a plurality of anodes 22. Therefore, the number of photoelectrons which are respectively collected in a plurality of anodes 22 is different in the incident parts of ultraviolet rays. The anodes 22 are arranged in one direction. Therefore, one-dimensional sensor can be achieved.

It is important that the number of photoelectrons which are respectively collected in a plurality of anodes 22 is different for achieving the one-dimensional sensor. Therefore, the first parts 28 of the cathodes 20 may be connected and integrated together. When the cathodes 20 are integrated together, the number of lead pins and bonding wires can be decreased compared with the case where a plurality of cathodes 20 are provided on the substrate 18.

Figure 7:
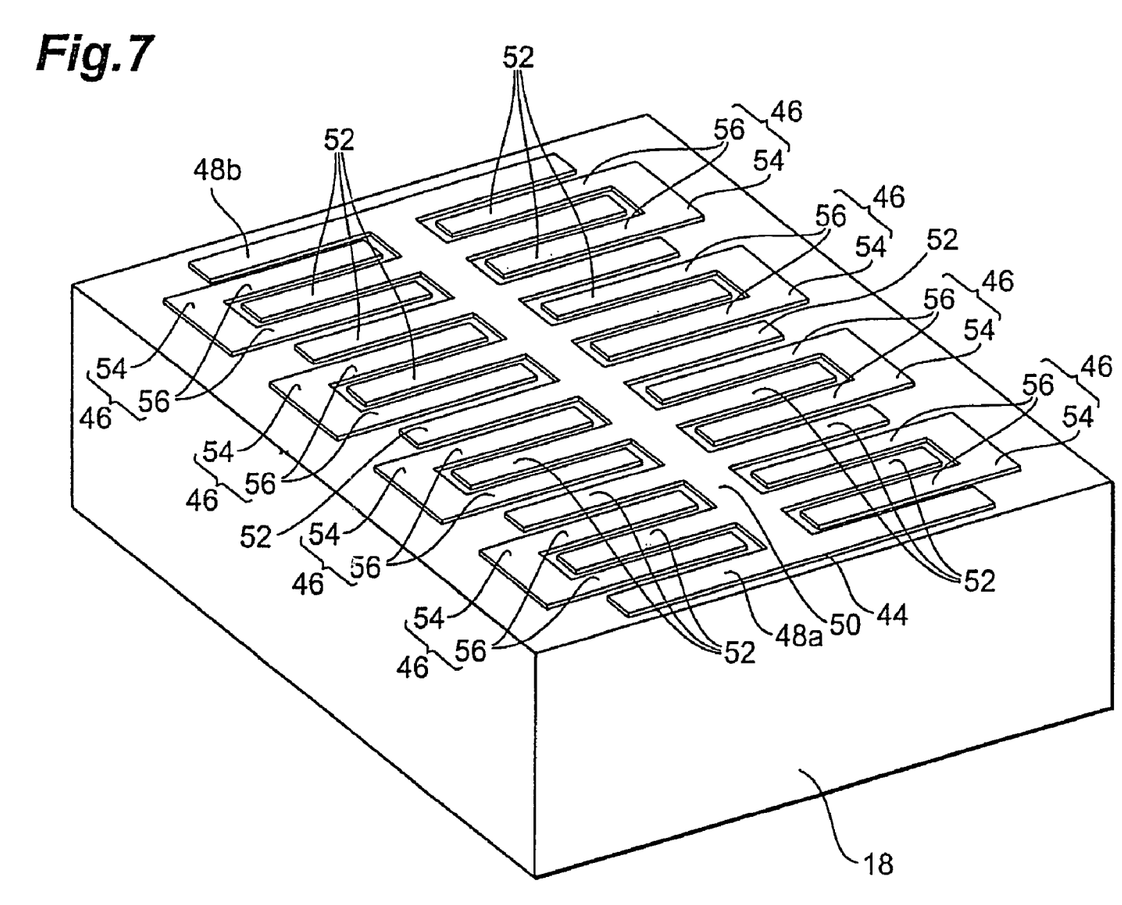
FIG. 7 is a block diagram of a second modification of a cathode and an anode of an ultraviolet sensor according to the present embodiment.

FIG. 7 is a block diagram of a second modification of the cathode 20 and the anode 22 used for the ultraviolet sensor 2. In the second modification, as shown in FIG. 7, the shapes of a cathode 44 and a anode 46 are different from the shapes of the cathode 20 and the anode 22 shown in FIG. 3. The number of anodes 46 is also different. The number of anodes 46 in the second modification is 3 or more (the number of anodes 46 is eight in FIG. 7.).

The cathode 44 has a plurality of first parts 48a and 48b provided on the substrate 18, a second part 50 connecting the first part 48a with the first part 48b, and a plurality of third parts 52 intersecting the second part 50. More particularly, the cathode 44 has the first parts 48a and 48b arranged in parallel on the substrate 18, the second part 50 crossing at a right angle with the first parts 48a and 48b, and seven third parts 52 crossing at a right angle with the second part 50. Herein, the shapes of the plurality of first parts 48a and 48b, the second part 50, and the plurality of third parts 52 are a rectangle when viewed from the incident side of ultraviolet rays.

Each anode 46 has a first part 54 and two second parts 56 extending in the same direction from the first part 54, and has an almost U-shape. Each anode 46 becomes engaged such that two second parts 56 pinch one of a plurality of third parts 52. The shapes of the first part of the anode 46 and the second part 56 are a rectangle when viewed from the incident side of ultraviolet rays.

The anodes 46 are arranged on both sides of the second part 50 of the cathode 44. The number of anodes 46 arranged herein is 1 or more (4 in FIG. 7) on one side of the second part 50, and 2 or more (4 in FIG. 7) on the other side. That is, a plurality of anodes 46 are two-dimensionally arranged on the surface of the substrate 18.

Figure 3:
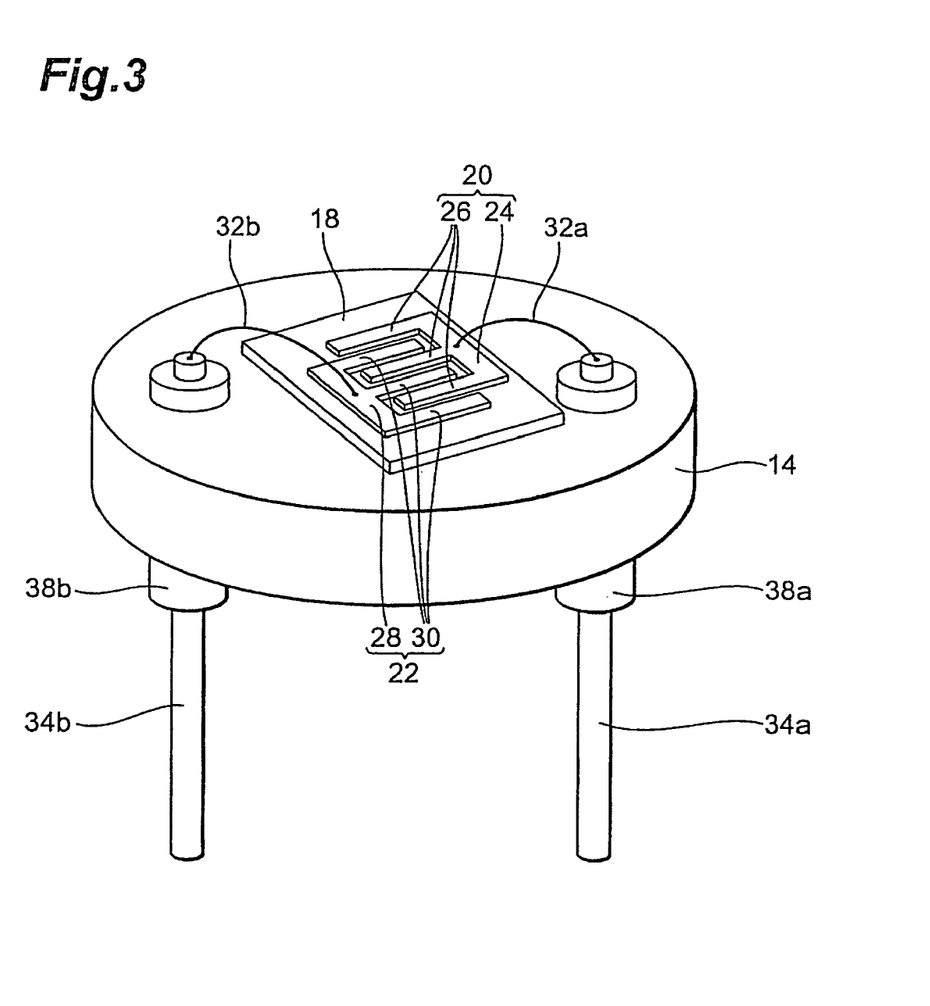
FIG. 3 is a perspective view showing the inside of an ultraviolet sensor according to the present embodiment.

Herein, the cathode 44 has a shape in which the second part 26 extending from the first part 24 of the cathode 20 shown in FIG. 3 extends in both side directions of the first part 24, and the shape thereof is called one of the comb-tooth shapes. Each anode 46 has a shape in which two second parts 30 extend from the first part 28 of the anode 22 shown in FIG. 3, and the shape thereof is called one of the comb-tooth shapes.

When the ultraviolet rays are made incident through the incident window 12, and reach the cathode 44 having the comb-tooth shape in the ultraviolet sensor 2 having the cathode 44 and the anode 46 described above, the photoelectrons are discharged into the vacuum from the cathode 44. The photoelectrons discharged into the vacuum are collected in the anode 46 which is nearest to the cathode 20.

Thus, since a plurality of cathodes 44 are provided in the ultraviolet sensor 2 according to the present modification, the photoelectrons discharged are collected in the cathode which is adjacent to the anode among the plurality of cathodes 44. Therefore, the number of photoelectrons which are respectively collected in a plurality of cathodes 44 is different in the incident parts of ultraviolet rays. The anodes 22 are two-dimensionally arranged. Therefore, a two-dimensional sensor can be achieved.

Figure 8:
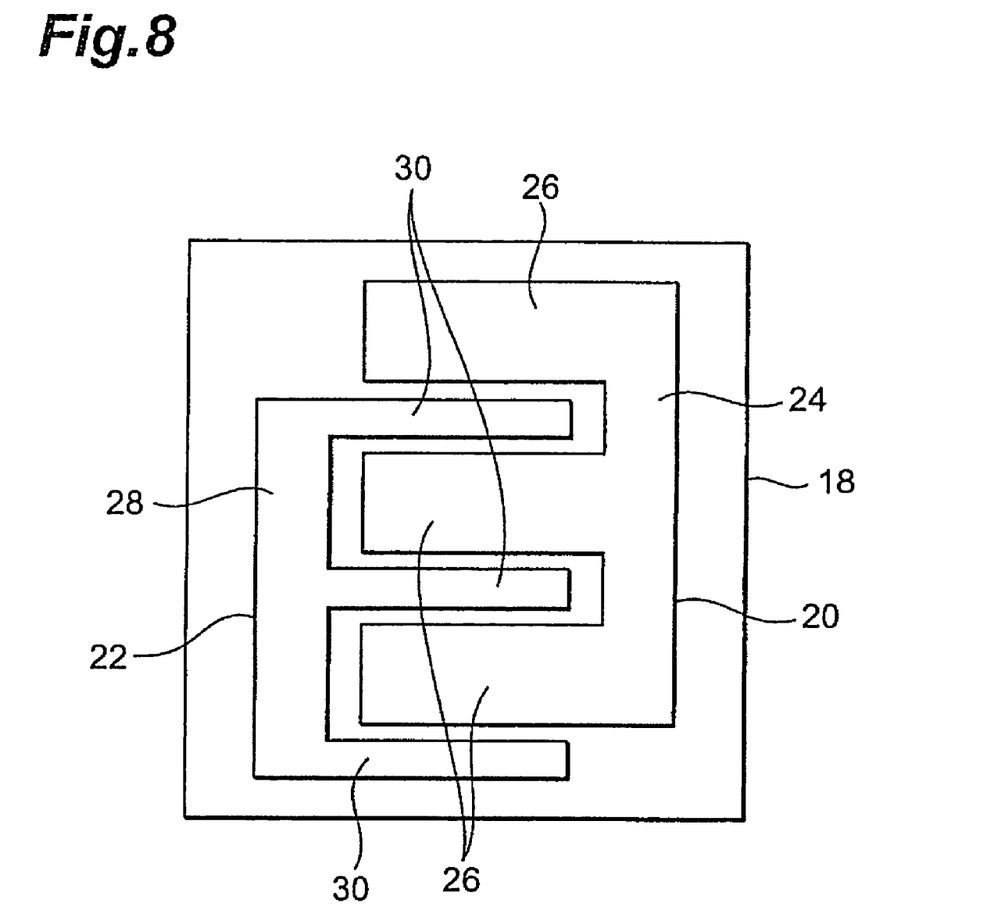
FIG. 8 is a block diagram of a third modification of a cathode and an anode of an ultraviolet sensor according to the present embodiment.

FIG. 8 is a block diagram of a third modification of the cathode 20 and the anode 22 used for the ultraviolet sensor 2. In the third modification, as shown in FIG. 8, the shapes of the cathode 44 and the anode 46 are different from those of the cathode 20 and the anode 22 shown in FIG. 3.

The width of the second part of the cathode 20 is set to be larger than that of the second part 30 of the anode 22. Thus, the area of the cathode 20 is relatively larger, and the discharged amount of the photoelectrons can be increased by setting the width of the second part of the cathode 20 to be larger than that of the second part 30 of the anode 22. As a result, the sensitivity of the ultraviolet sensor 2 can be improved.

Figure 9:
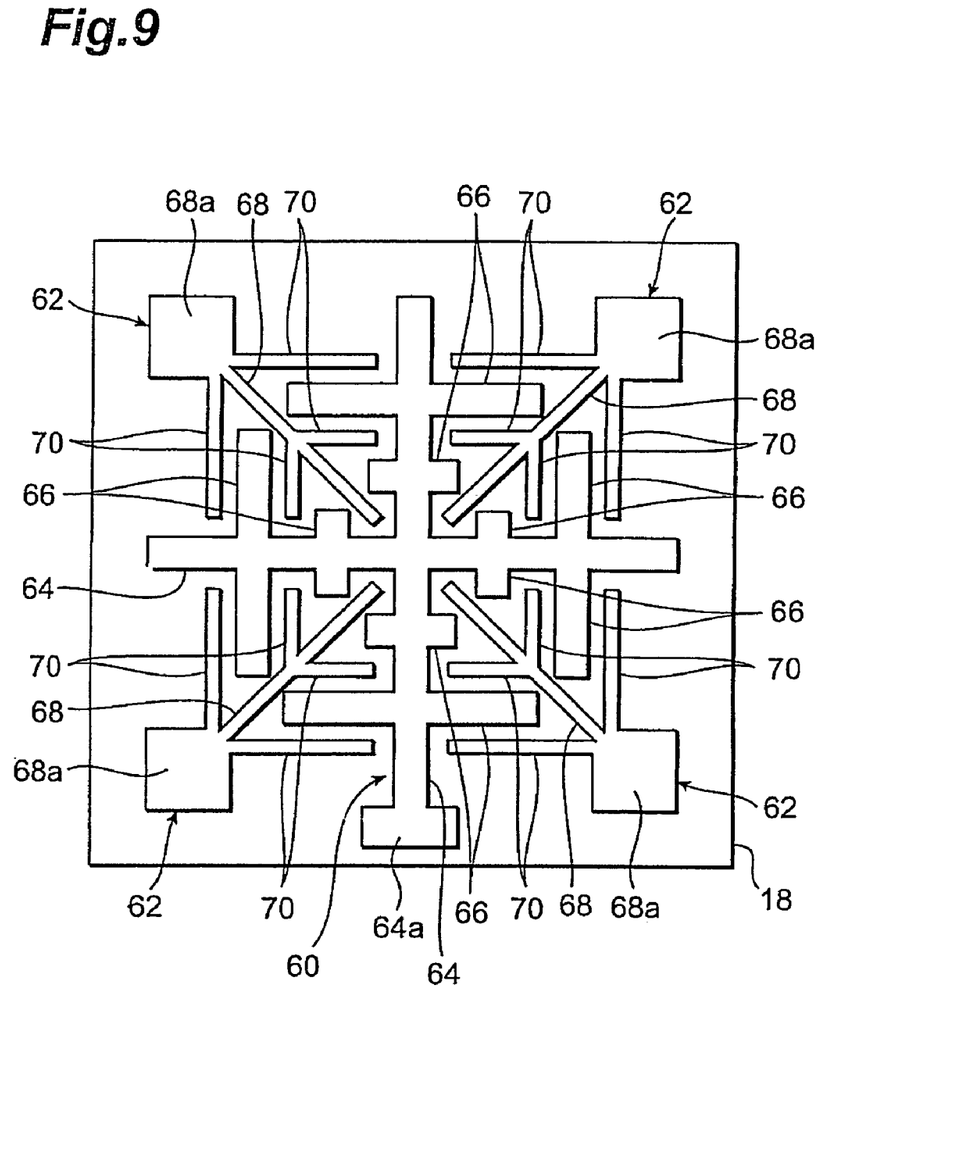
FIG. 9 is a block diagram of a fourth modification of a cathode and an anode of an ultraviolet sensor according to the present embodiment.

FIG. 9 is a block diagram of a fourth modification of the cathode 20 and the anode 22 used for the ultraviolet sensor 2. In the fourth modification, as shown in FIG. 9, the shapes of a cathode 60 and an anode 62 are different from those of the cathode 20 and the anode 22 shown in FIG. 3.

The cathode 60 contains a plurality of principal cathode parts 64 radially extended, and diverging cathode parts 66 provided for every principal cathode part 64 so as to intersect (for instance, orthogonal at a right angle) the principal cathode part 64. A large width part 64a for connecting a bonding wire is formed in one principal cathode part 64. In the present modification, four principal cathode parts 64 are provided at equal-angle intervals (at an interval of 90 degrees). Two diverging cathode parts 66 are provided for every principal cathode parts 64.

The anode 62 contains a plurality of principal anode parts 68 provided so as to radially extend between the principal cathode parts 64 being adjacent, and a diverging anode part 70 provided for every principal anode part 68 so as to intersect (for instance, at 45 degrees) the principal anode part 68. A large width part 68a for connecting a bonding wire is formed in each principal cathode part 68. In the present modification, four principal anode parts 68 are provided at equal-angle intervals (at an interval of 45 degrees). Four diverging anode parts 70 are provided for every principal cathode parts 68.

The width of the diverging cathode part 66 is set to be larger than that of the diverging anode part 70. The diverging cathode part 66 and the diverging anode part 70 are provided so as to overlap mutually when viewed in the radial direction. That is, the diverging cathode part 66 and the diverging anode part 70 are provided such that a pair of diverging cathode parts 66 pinch one diverging anode part 70, or such that a pair of diverging anode parts 70 pinch one diverging cathode part 66.

In the above configuration, the photoelectrons discharged from the cathode 60 (principal cathode part 64 and diverging cathode part 66) are collected in the principal anode parts 68 and the diverging anode part 70 which are adjacent to the cathode 60 among a plurality of principal anode parts 68 and the diverging anode part 70. Therefore, the number of photoelectrons which are respectively collected in a plurality of anodes 62 (a plurality of principal anode parts 68 and the diverging anode part 70) is different in the incident parts of ultraviolet rays. Therefore, the incident position of ultraviolet rays can be generally known, and a two-dimensional sensor can be achieved.

Figure 10:
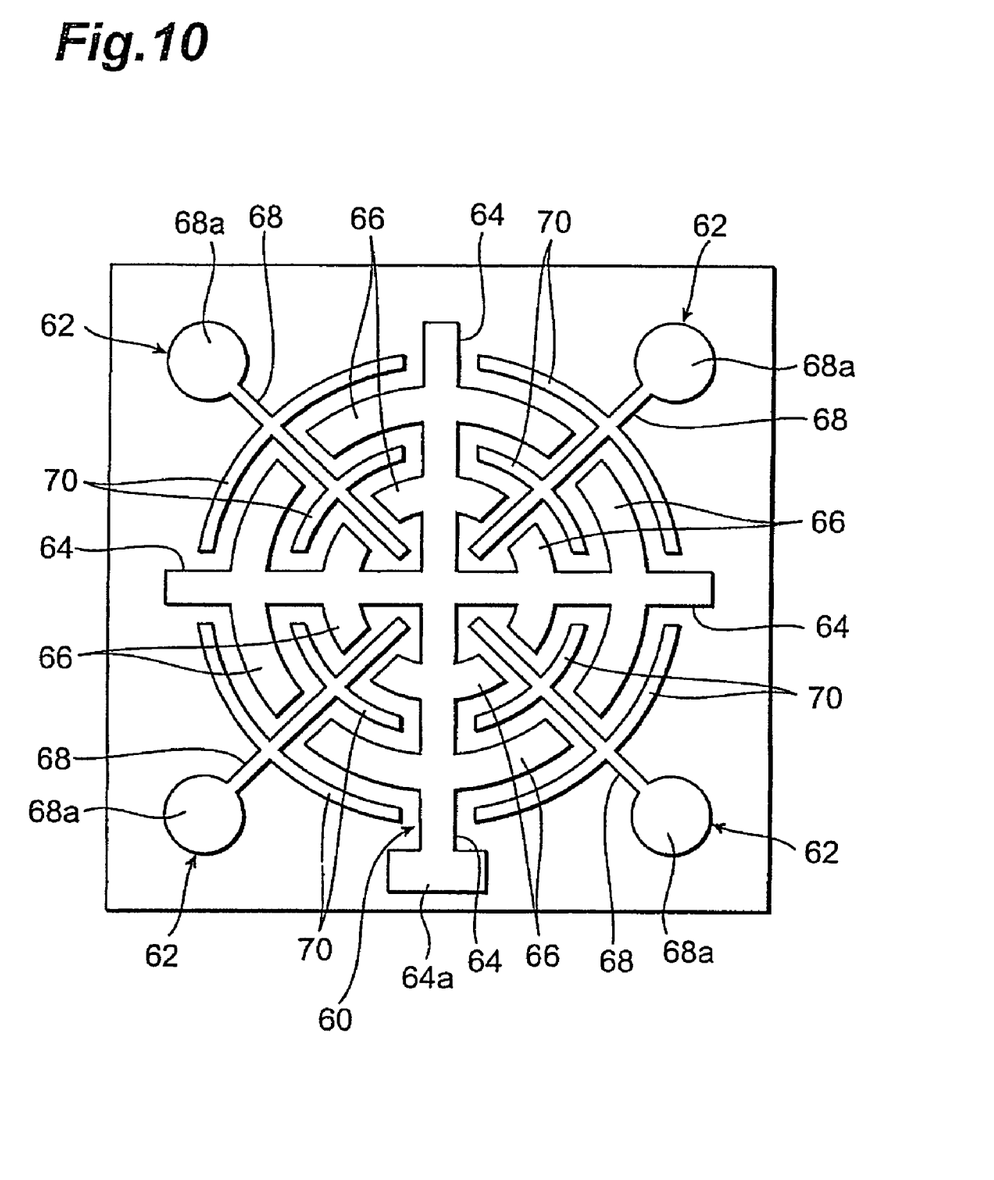
FIG. 10 is a block diagram of a fifth modification of a cathode and an anode of an ultraviolet sensor according to the present embodiment.

FIG. 10 is a block diagram of a fifth modification of a cathode 20 and an anode 22 used for an ultraviolet sensor 2. In the fifth modification, as shown in FIG. 10, the shapes of the diverging cathode part 66 and the diverging anode part 70 are different from those of the diverging cathode part 66 and the diverging anode part 70 shown in FIG. 9.

In the fifth modification, the diverging cathode part 66 and the diverging anode part 70 provide a circular arc shape. In the present modification, in a manner equivalent to the fourth modification described above, the incident position of ultraviolet rays can be generally known, and a two-dimensional sensor can be achieved.

The present invention is not limited to the embodiment and the modifications described above. For instance, the whole substrate 18 may have insulation, and an insulating layer (thin film or the like) may be laminated on the substrate 18 as a surface on which the anodes 22 and 46 and the cathodes 20 and 44 are provided.

It is preferable that the surface of the cathode 20 is subjected to cleaning treatment. In this case, since deposition or the like deposited on the cathode 20 is removed, ultraviolet rays can be excellently made incident in the cathode 20. To prevent filth from adhering to the cathode 20 after being subjected to cleaning treatment, it is more preferable to enclose hydrogen or the like in the space of the casing 10, improve the cleanliness by heat-treating, and then exhaust.

In addition, the number of principal anode parts 68 and diverging anode parts 70 is not limited to the modifications described above.

INDUSTRIAL APPLICABILITY

The present invention can be used for an ultraviolet sensor.

The invention claimed is:

1. A light detecting sensor comprising:
   a substrate having electric insulation;
   a cathode discharging photoelectrons through the incidence of light;
   an anode collecting the photoelectrons discharged from the cathode,
   a casing having a space storing said substrate, said cathode and said anode, the space being evacuated,
   wherein said cathode and said anode are provided on the same surface of said substrate, and
   wherein said cathode and said anode have a comb-tooth shape so as to be mutually engaged.

2. The light detecting sensor of claim 1, wherein a plurality of anodes are provided.

3. The light detecting sensor of claim 1, wherein said cathode discharges the photoelectrons through the incidence of ultraviolet rays.

4. The light detecting sensor of claim 1, wherein the width of said cathode is set to be larger than that of said anode.

5. A light detecting sensor comprising:
   a substrate having electric insulation;
   a cathode discharging photoelectrons through the incidence of light;
   an anode collecting the photoelectrons discharged from the cathode,
   a casing having a space storing said substrate, said cathode and said anode, the space being evacuated,
   wherein said cathode and said anode are provided on the same surface of said substrate,
   wherein said cathode contains a plurality of principal cathode parts radially extended, and a diverging cathode part provided for every principal cathode part so as to intersect said principal cathode part,
   wherein said anode contains a plurality of principal anode parts provided so as to radially extend between said principal cathode parts being adjacent, and a diverging anode part provided for every principal anode part so as to intersect said principal anode part, and
   wherein said diverging cathode part and said diverging anode part are provided so as to overlap mutually when viewed in the radial direction.

\* \* \* \* \*